US007306149B2

(12) United States Patent
DeBiase, Jr.

(10) Patent No.: US 7,306,149 B2
(45) Date of Patent: Dec. 11, 2007

(54) BALLOT FORM AND METHOD FOR MAKING AND USING SAME

(76) Inventor: Salvatore E. DeBiase, Jr., 780 Admiralty Way, Webster, NY (US) 14580

( * ) Notice: Subject to any disclaimer, the term of this patent is extended or adjusted under 35 U.S.C. 154(b) by 53 days.

(21) Appl. No.: 11/428,042

(22) Filed: Jun. 30, 2006

(65) Prior Publication Data

US 2006/0249579 A1 Nov. 9, 2006

Related U.S. Application Data

(63) Continuation of application No. 10/348,804, filed on Jan. 22, 2003, now Pat. No. 7,070,115.

(60) Provisional application No. 60/350,887, filed on Jan. 23, 2002.

(51) Int. Cl.
*G06K 19/06* (2006.01)

(52) U.S. Cl. ...................................... 235/386; 235/494

(58) Field of Classification Search ................ 235/494, 235/386, 454, 455, 456, 432
See application file for complete search history.

(56) References Cited

U.S. PATENT DOCUMENTS

| | | | | |
|---|---|---|---|---|
| 3,900,961 A | | 8/1975 | Sokoloski et al. | |
| 3,995,381 A | | 12/1976 | Manfred et al. | |
| 4,217,487 A | | 8/1980 | Kjeer | |
| 4,300,123 A | | 11/1981 | McMillin et al. | |
| 4,937,439 A | | 6/1990 | Wanninger et al. | |
| 5,001,330 A | | 3/1991 | Koch | |
| 5,023,435 A | | 6/1991 | Deniger | |
| 5,134,669 A | | 7/1992 | Keogh et al. | |
| 5,140,139 A | | 8/1992 | Shepard | |
| 5,184,003 A | | 2/1993 | McMillin et al. | |
| 5,198,642 A | | 3/1993 | Deniger | |
| 5,213,373 A | | 5/1993 | Ramos | |
| 5,535,118 A | | 7/1996 | Chumbley | |
| 5,610,383 A | | 3/1997 | Chumbley | |
| 5,711,672 A | | 1/1998 | Redford et al. | |
| 6,293,868 B1 | | 9/2001 | Bernard | |
| 6,741,738 B2 | | 5/2004 | Taylor | |
| 6,786,396 B2 | | 9/2004 | Constantine | |
| 6,892,944 B2 | * | 5/2005 | Chung et al. | 235/386 |
| 7,070,115 B2 | * | 7/2006 | DeBiase | 235/494 |
| 7,210,617 B2 | * | 5/2007 | Chaum | 235/51 |
| 2003/0062411 A1 | * | 4/2003 | Chung et al. | 235/386 |
| 2003/0136836 A1 | * | 7/2003 | DeBiase | 235/386 |
| 2003/0173404 A1 | * | 9/2003 | Chung et al. | 235/386 |
| 2006/0249579 A1 | * | 11/2006 | DeBiase | 235/386 |

OTHER PUBLICATIONS

Answer Sheet Form No. 72070 by NCS, 1984, p. 1.

* cited by examiner

*Primary Examiner*—Thien Minh Le
(74) *Attorney, Agent, or Firm*—Bosch & Nickerson LLP; Duane C. Basch

(57) ABSTRACT

The present invention is an improved scannable answer sheet or document suitable for a balloting process and a method for producing such document using a printing process, particularly a document that may be printed in a single color without impacting the ability of the document to be scanned by an automated mechanism.

14 Claims, 11 Drawing Sheets

BALLOT FORM AND METHOD FOR MAKING AND USING SAME

CROSS REFERENCE & PRIORITY CLAIM

This continuation application claims priority from both of the following applications, U.S. patent application Ser. No. 10/348,804, filed Jan. 22, 2003, now U.S. Pat. No. 7,070, 115, which claims priority from U.S. Provisional Application U.S. Ser. No. 60/350,887 filed Jan. 23, 2002, and also hereby incorporates by reference the disclosures of both applications in their entirety.

This invention relates generally to an improved ballot form and method for making the same, and more particularly to the manner by which a ballot form may be printed in a single color ink (e.g., black ink), yet provide human-readable regions for marked responses without interfering with the automated scanning of such documents.

BACKGROUND AND SUMMARY OF THE INVENTION

The present invention is directed to an improved ballot or similar scannable response form, wherein the printed form may be printed in a single-color, dark ink, with defined areas in which users are to indicate their response(s), but which do not interfere with the scanning of the form. Scanners of the type in which the present application find a particular use are described, for example, in the following patents U.S. Pat. No. 4,217,487, issued Aug. 12, 1980 to Kjeer and U.S. Pat. No. 5,711,672, issued Jan. 27, 1998, to Redford, the disclosures of which are incorporated herein by reference. One such scanner is marketed by National Computer Systems, Inc. and Sequoia Pacific Voting Equipment, Inc. under the name of National Computer Systems/Teamwork Scanning System.

Additional teachings regarding optical scanning systems and scannable answer sheets or ballots may be found in a number of United States patents. U.S. Pat. No. 3,900,961 to Sokolski et al. discloses a test sheet having a control mark column and answer receiving spaces aligned with a corresponding answer control mark, and a sheet reading apparatus comprising a light source for illuminating both the control mark column and answer receiving spaces, and control channel sensors that are positioned over answer columns for detecting answer indicia.

U.S. Pat. No. 3,995,381 to Manfred et al. discloses a low visibility answer sheet having a plurality of uniquely identified groups of answer areas containing a plurality of five potential individual answer areas (response bubbles), aligned in columns identified with block letters.

U.S. Pat. No. 4,300,123 to McMillin et al. discloses an optical reading system for scanning and reading a student's test score sheet, comprising a light source and a line scan camera for scanning a marked sheet as it is moved past the camera.

U.S. Pat. No. 5,001,330 to Koch discloses an optically scanned answer sheet having a plurality of indicia receiving locations (response bubbles), and a fail-safe mark extending between and connecting two adjacent marks on the sheet. This patent further teaches apparatus requirements for reflective-read scanning of such sheets.

U.S. Pat. No. 5,184,003 to McMillin et al. discloses a scannable form having a pre-printed control mark column along an edge of the form comprising a plurality of scan control (timing) marks, and for at least one of such scan control marks, a response area having a plurality of response bubbles that are printed in rows. This patent further teaches the use of various control marks on such sheets by optical mark reading systems.

U.S. Pat. No. 5,535,118 to Chumbley et al. discloses a scannable data card having rows of response bubbles that are specifically spaced and positioned relative to fixed reference points on the data card. The disclosures of the above-identified United States patents are incorporated herein by reference.

As depicted in FIG. 1, it is well known to use optically scannable documents or sheets for the recordation of information, particularly including test results and other data. Similarly, as depicted in FIG. 2, scannable documents have been previously employed for use as ballots to a limited extent. However, as indicated in FIG. 2, the response bubbles 210 used in such sheets had to be printed in an alternative color such as red, or as discontinuous lines (i.e., dashed or dotted lines) in order to avoid the possibility of the response bubble itself being detected as a mark.

Also well known is the fact that the optical scanning equipment is specifically designed so as to be sensitive to one or more colors of marks, yet not able to read a particular color spectrum (e.g., red).

The following text within quotation marks is an excerpt from the manufacturer's documentation supplied with the OpScan Model 6 ballot scanning machine, manufactured by National Computer Systems, Inc. of Eden Prairie, Minn.:

"Ink Read Head Features

The ink read head on the OpScan scanners allows the scanners to read blue and black ballpoint ink in addition to number 2 pencil marks. The ink read head is known as a "limited visible" read head because it does not read colors in the red color spectrum. Other colors may be detected by the ink read head, but it is only guaranteed to detect blue and black ink and number 2 pencil.

The ink of some pens bleeds through the paper and may cause scanning errors if the location of the bleedthrough corresponds to a live response on the reverse side of the form.

Marks made with some felt-tip pens containing water-based ink may read poorly if the response bubbles contain printing. This is due to the ink pen not adhering to the form where printing press ink is present.

In general, marks made with black or blue ballpoint pens allow accurate, troublefree processing through National Computer Systems ink read scanners. Lack of erasability must be understood from the outset.

Forms Requirements

To distinguish marked responses from the printing on the form, the following color restrictions apply to all forms used with the ink read head:

Forms must be printed on white reflective paper or white Trans-Optic® paper.

All response positions must be printed in the red color spectrum. This includes the response bubble outlined, any characters or text printed within the bubbles, and any shading within the bubbles.

Other than the black skunk marks, all text in the skunk mark row must be printed in the red color spectrum.

The bias bar must be printed in the same red spectrum color used to print the response positions.

Red spectrum colors for Trans-Optic paper are:

Red 85

Orange 24

Red spectrum colors for reflective paper are:

Red 85

Red 28

Orange 78

Orange 79

The ink read head uses reflective read technology. Therefore there are no restrictions concerning the overlapping response positions on the front and back of the form.

Areas of the form not used for response positions, such as instructions or logos, may be printed using any color ink. The ink read head may read these areas as marks, but the host computer software will ignore them since they are outside the response position areas. Printing in non-red colors must be a minimum distance of 1/32" from any response position.

Note: If you are using the Scan Tools® application program, be aware that all non-red printing within the valid X/Y response coordinates may appear as marked responses when creating your application definition."

As will be appreciated from a review of the above excerpt, the National Computer Systems, Inc. OpScan scanners are able to read blue and black ink marks, yet are unable to read colors in the red color spectrum. While it is possible to produce scannable documents that include a combination of red response bubbles and black or blue printing of information or other indicia, such multi-color printing is both costly and objectionable from a balloting perspective. In fact, some states and local voting districts specifically prohibit the use of color on ballots, particularly where a color may have particular connotations relative to one political party.

In order to consider the production of a ballot that is suitable for scanning, it was necessary to design a ballot and associated response bubbles that would be printable in one ink color (e.g., black), yet where the response bubbles would not be detected as marks. Initially, ballots such as those depicted in FIG. 2 were developed, where the response bubbles were of the same size and shape as traditional OpScan forms (e.g. bubbles 110 of FIG. 1), but where the bubble was produced with a discontinuous line. Unfortunately, while such a bubble configuration was scannable without significant erroneous detection, it was also difficult for voters with vision impairments to view and correctly fill-in the response bubbles associated with the desired candidate or proposal.

In the process of developing an acceptable ballot that may be printed in a single-color ink, using a continuous response bubble that may be easily viewed by the range of voters, the present invention was developed. In particular, the present invention includes not only a ballot formed using continuous-line bubbles printed in black or other dark-colored ink, but also the process by which such ballots are created and used.

Disclosed herein is a method for producing a scannable answer sheet on a blank substrate, comprising: printing, on at least a portion of one side of the substrate, a plurality of marks to indicate a plurality of response regions, said marks being printed using an ink that is non-reflective for a plurality of scanning light colors, wherein said marks are arranged in a predefined orientation and spacing relative to the substrate and where said marks are printed with at least one continuous line segment so as to indicate the response region associated therewith.

Also disclosed herein is a method for recording a voter's ballot selection, comprising: creating a ballot by printing, on at least a portion of one side of a substrate, a plurality of indicia and associated response regions, wherein said indicia and response regions are arranged in a predefined orientation and are spaced within a grid oriented relative to the substrate and where said plurality of indicia and associated response regions are printed in an ink that is non-reflective for a plurality of scanning light colors and said response regions are indicated with a continuous line segment to provide a complete, visible response region to a voter; providing said ballot to a voter for casting of at least one vote by placing a mark within at least one of the response regions; retrieving a completed ballot after said voter has cast the at least one vote; and scanning said completed ballot, using an optical scanning device, to detect and record only those marks within the response regions as votes for candidates represented by the associated indicia.

Further disclosed herein is a method for illuminating and reflecting the image of a scannable answer sheet comprising a plurality of response regions, arranged at a plurality of predefined locations on the sheet where said response regions are identified by a printed line segment using an ink that is non-reflective for a plurality of scanning light colors, comprising: directing a beam of light upon the surface of the answer sheet; moving the sheet relative to the beam of light such that the light is scanned along the surface of the sheet; and reflecting at least a portion of the beam of light from the sheet to a photodetector disposed adjacent to the sheet, wherein the printed line segment defining said response region does not result in the detection of the printed line segment as a mark within said response region.

Disclosed herein is a scannable answer sheet printed on a blank substrate using a non-reflective ink, comprising: marks defining a rectangular perimeter of said answer sheet, said marks disposed along a periphery of said rectangular perimeter; inspection marks disposed proximate to at least one edge of said answer sheet; a row of timing marks disposed proximate to and along at least a portion of at least one edge of said answer sheet; and a plurality of response regions defined by a line and arranged in a predefined orientation and spacing relative to said substrate and said timing marks.

Figure 1:
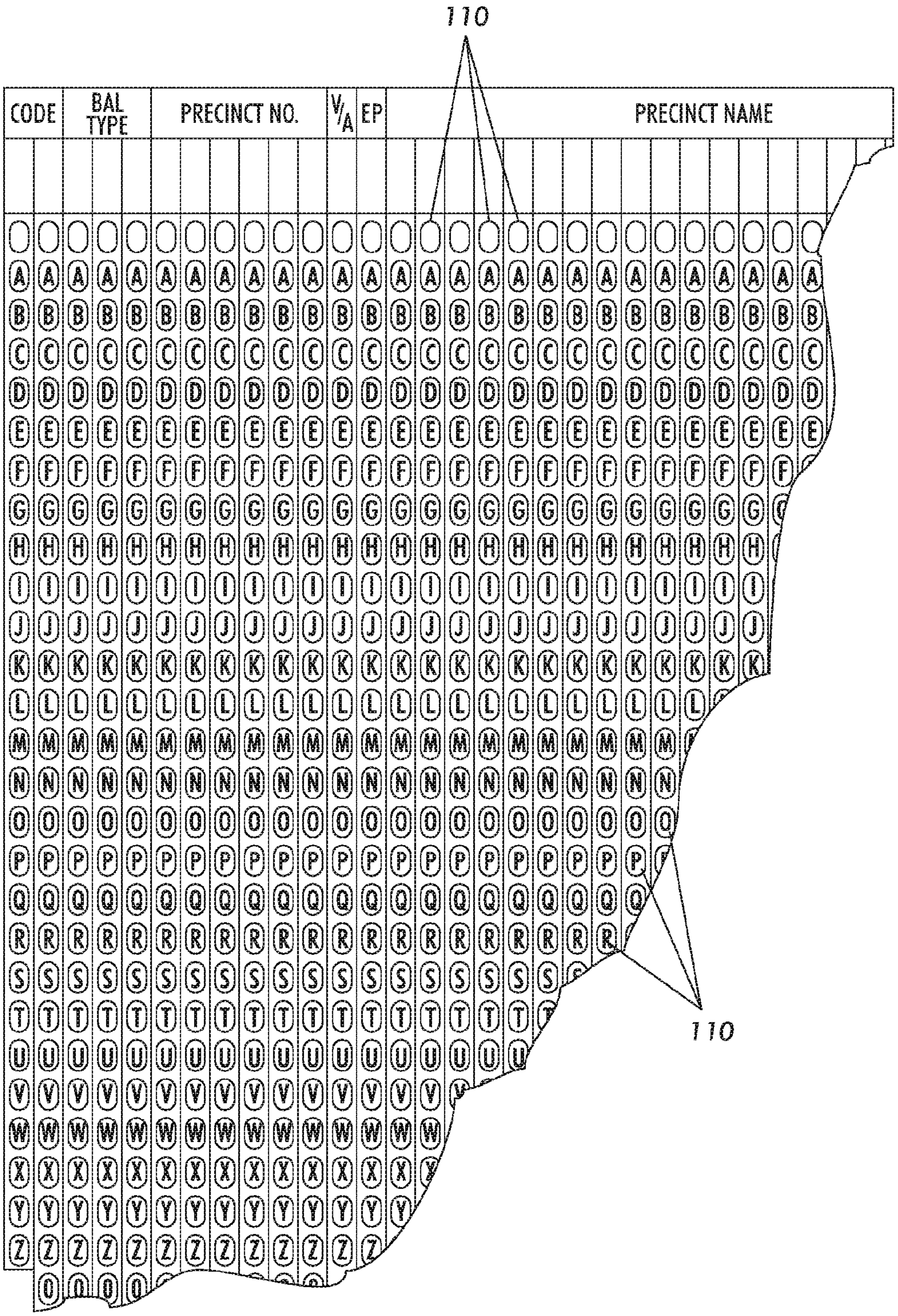
FIG. 1 is an illustrative example of a portion of a red-ink optically scannable response sheet.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

As used herein, the term "bubble" or "response bubble" is intended to refer to an element printed or otherwise rendered on a substrate such as a document, wherein the bubble defines a region within which a mark may be placed for optical scanning and recognition of the mark.

The term "ballot" is intended to refer to any hard copy document or similar substrate that has printed thereon at least one candidate or proposition for selection or approval by a voter.

The term "line density" is intended to refer to the physical width of a line or other mark on paper, i.e. the distance from one edge of the mark in contrast with the approximately white paper, across the mark, to the other edge of the mark in contrast with the approximately white paper.

The term "commercial imposition program" is intended to refer to a commercial software program that facilitates the composition and printing of pages comprising graphics and text, such as PageMaker by Adobe Systems Incorporated of San Jose, Calif.

The term "dimensionally stable", when used in reference to printing films or plates is meant to describe printing films or plates that are maintained in position within a tolerance of plus or minus 0.0001 inch.

The term "pounds", when used in reference to paper weight, pertains to the "basis weight" of printing paper, and in reference to the paper upon which ballots are printed, refers to the weight in pounds of a ream (500 sheets) of such paper, each sheet having a width of 25 inches and a height of 38 inches.

The tem "caliper", when used in reference to paper, refers to the thickness of a sheet of paper, typically expressed in thousandths of an inch.

The term "red color spectrum", when used in reference to the ability or inability of a scanning device to read a mark of a particular color, refers to ink marks having a color value of between 032 Red and 199 Red on the Pantone Matching System color scale.

Figure 3A:
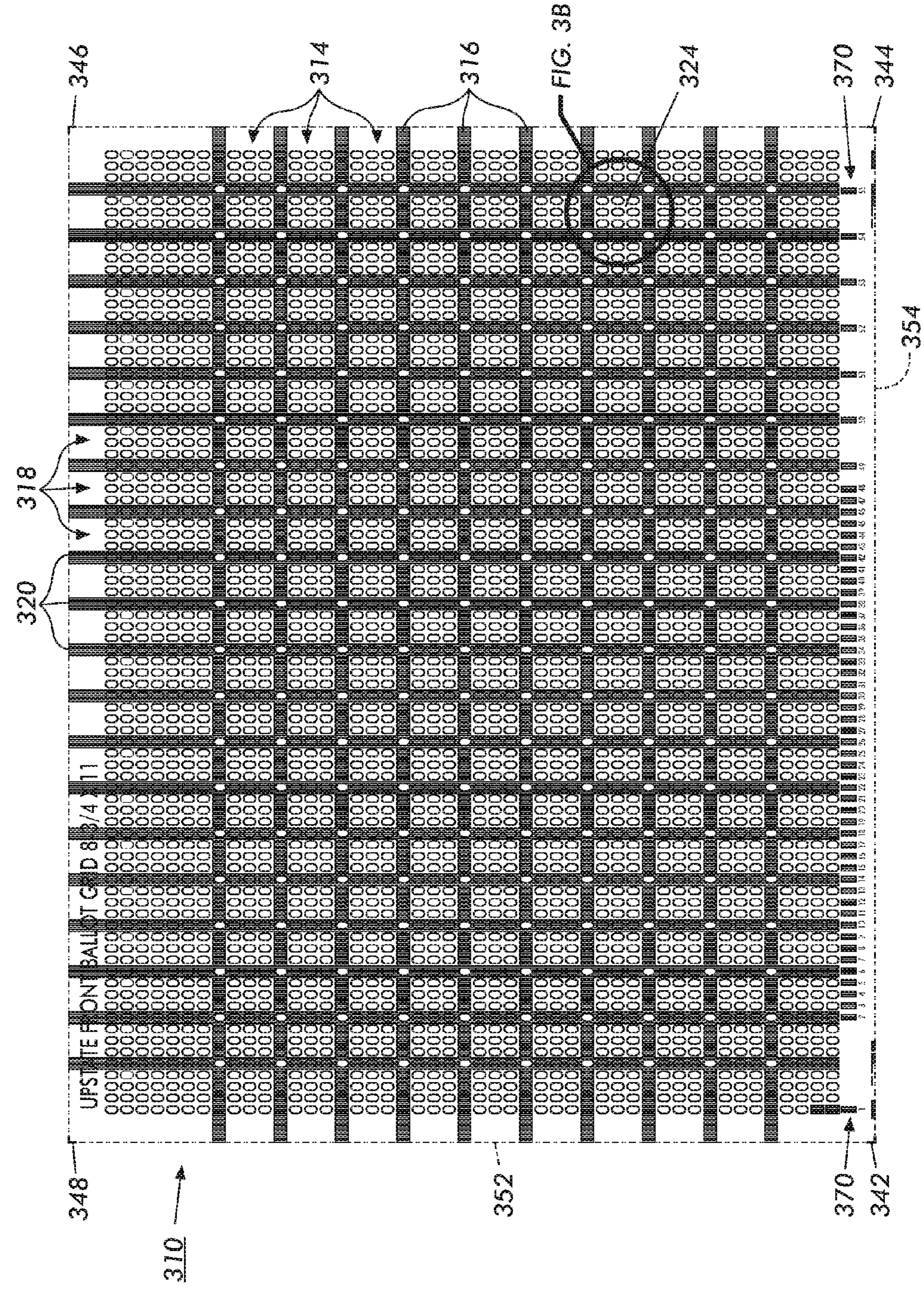
FIG. 3A is an illustrative example of one embodiment of a blank ballot form and associated grid structure in accordance with an aspect of the present invention.
Figure 4:
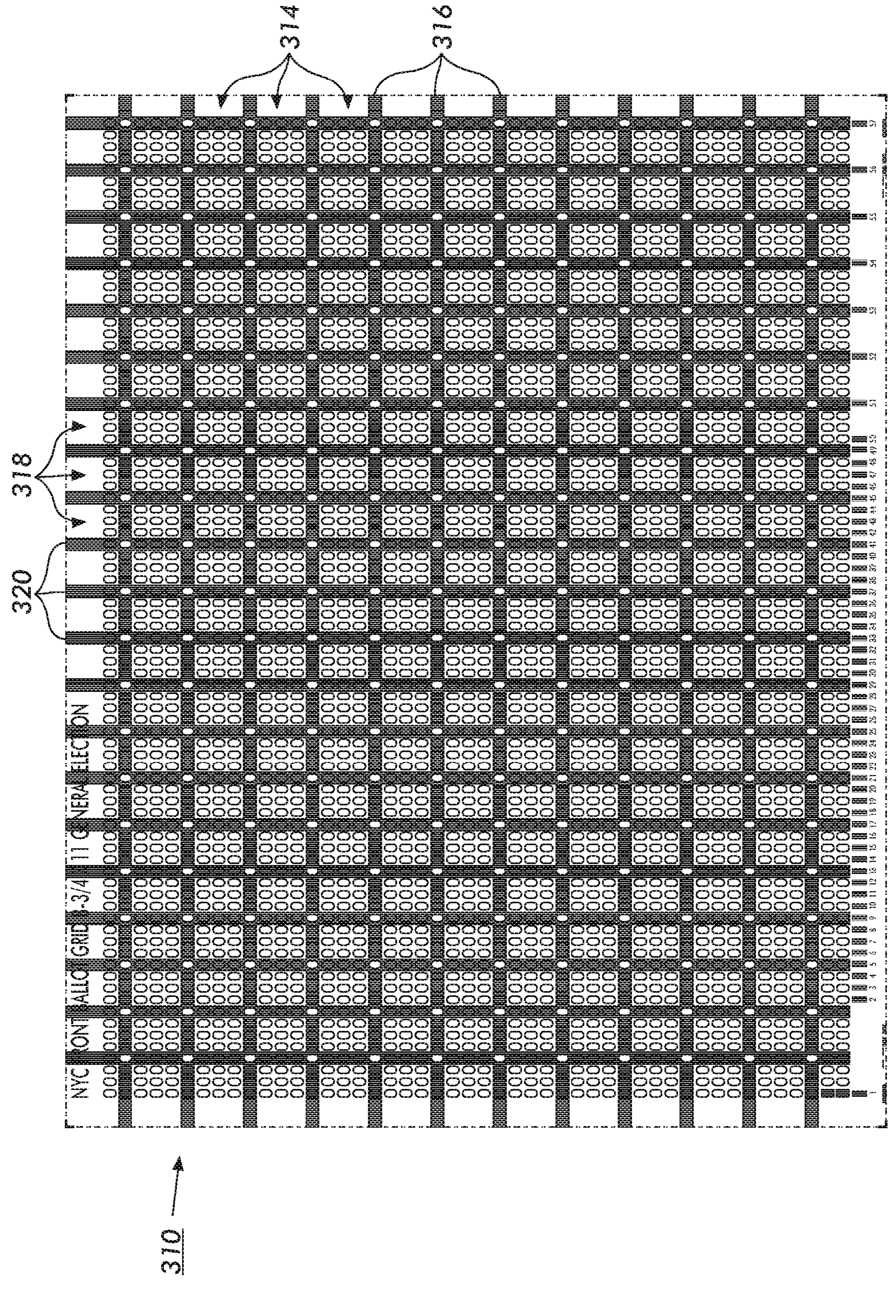
FIG. 4 is an illustrative example of another embodiment of a blank ballot form and associated grid structure in accordance with an aspect of the present invention.

By way of a general explanation, FIG. 3A and FIG. 4 are reduced-size images depicting a ballot grid 310 as may be used in accordance with the present invention to lay out a ballot having indicia identifying a particular candidate in conjunction or association with a response bubble for selection of the candidate by a voter. More specifically, grid 310 is comprised of an array of grid cells 324 defined by a plurality of rows 314 and columns 318. Rows 314 are defined by the sensed (shaded) bubble rows 316, and columns 318 are defined by the sensed (shaded) bubble columns 320.

Figure 3B:
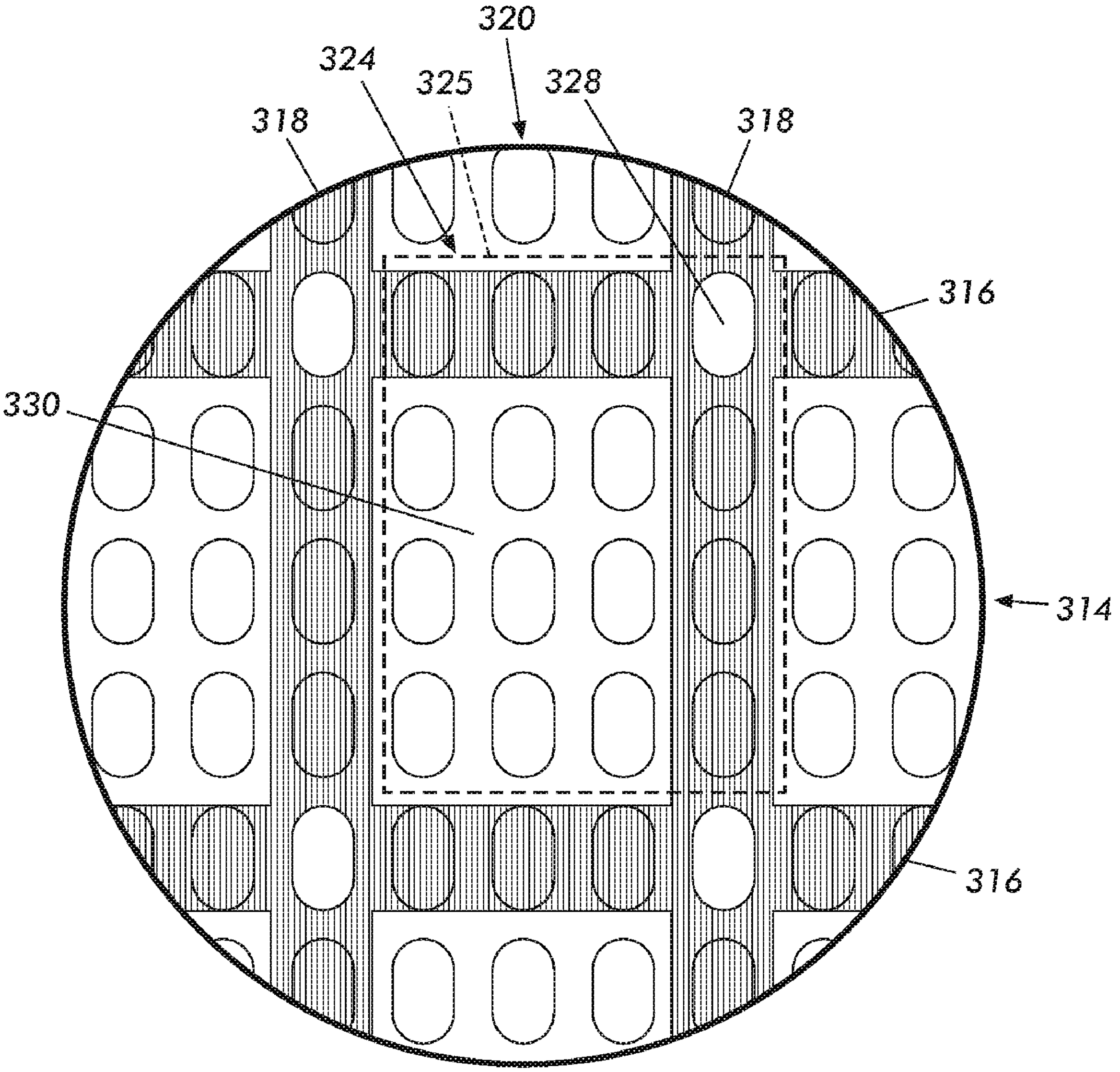
FIG. 3B is a magnified view of one repeating grid cell of the blank ballot form of FIG. 3A.

FIG. 3B is a magnified view of one repeating grid cell of the blank ballot grid form of FIG. 3A. Referring to FIG. 3B, repeating grid cell 324 is defined by the sensed (shaded) bubble rows 316 and sensed (shaded) bubble columns 320. A single repeating grid cell 324 is shown in FIG. 3B by dotted line rectangle 325. Within grid cell 324, a ballot includes a response bubble 328 located at the intersection of sensed (shaded) bubble row 316 and sensed (shaded) bubble columns 320, and a printed indicia region 330 that may include a candidate's name and/or designation of a party affiliation.

Figure 2:
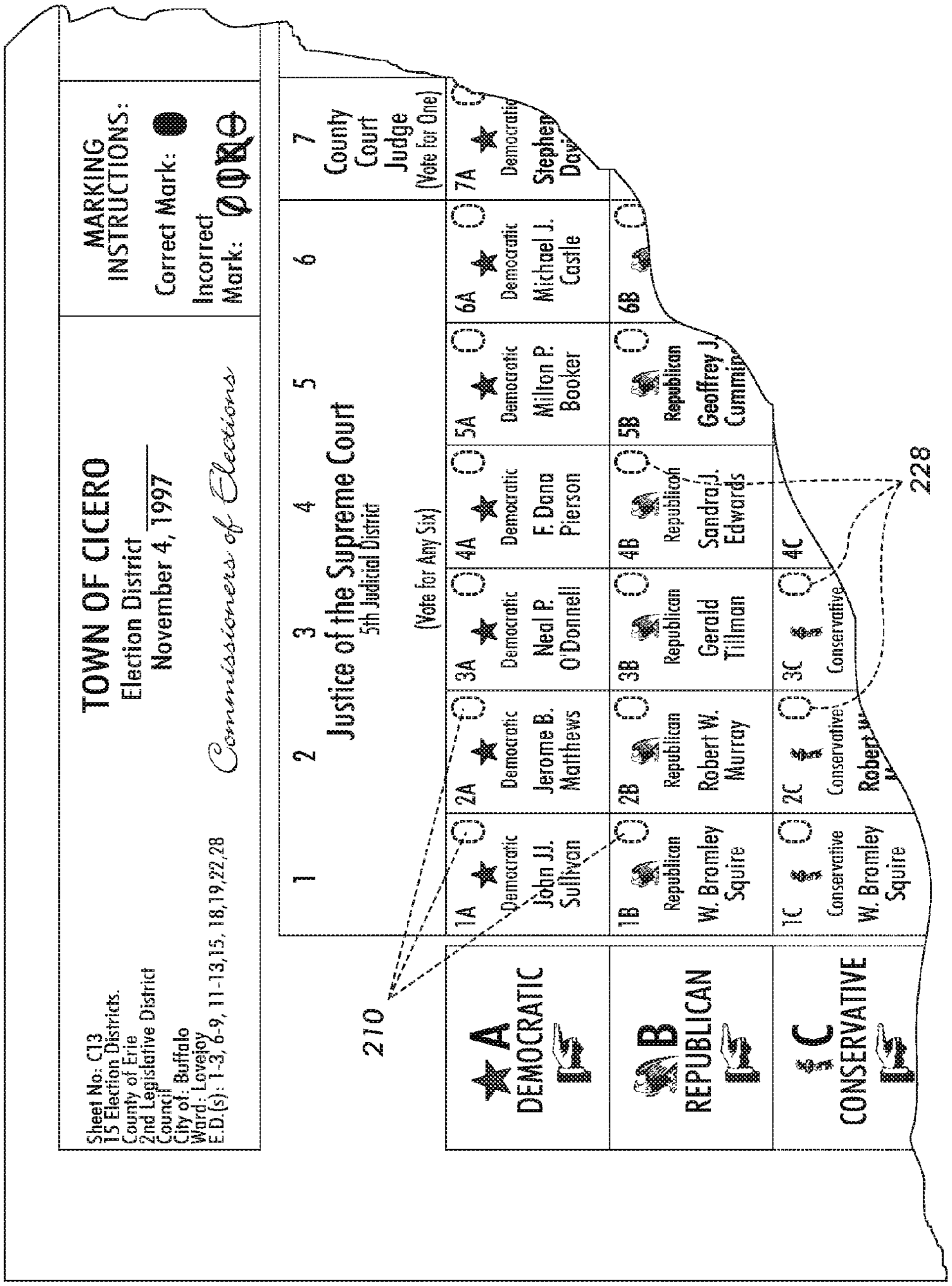
FIG. 2 is an a portion of an optically scannable ballot.

During layout of a ballot, a computer-based system receives the candidate information (including at least the candidate name, party affiliation, an office for which the person is a candidate). Upon receipt of such information in a predefined format, the system inserts the candidate name and insignia in a grid cell, in the indicia region 330, associated with the political party and elected office. (In a typical general election ballot, political parties are associated with rows 314, and elected offices are associated with columns 320.) In this manner, the ballot grid of FIG. 3A or FIG. 4 may be employed to produce a ballot of the nature represented by FIG. 2, for example, where the response bubbles 228 are printed using a discontinuous line in order to avoid false detection as a mark.

As is known, once such ballots are laid out, they may be printed using a lithographic printing process, for example on printing presses manufactured by the Komori Company. It will also be appreciated, based upon a review of the ballot grid examples in FIGS. 3 and 4, that alternative arrangements and configurations of the ballots are possible. In most cases, however, all such alternatives are subject to review by one or more authorities responsible for administering the voting process.

In one embodiment, the ballot form is laid out using the following:

1. proprietary Elect It® software as registered for copyright on Apr. 20, 1998 (TXU850-237) and Elect It Bridge-NYS, registered on May 16, 2000 (TXU962-916);
2. commercial imposition programs;
3. imagesetters that maintain an accuracy of +/−25 microns repeatability and measurement accuracy;
4. printing resolutions of 4064 dots per inch (dpi) on dimensionally stable films or plates;
5. flat black non-reflective, non-magnetic inks, customized with "gloss modifier" by adding the gloss modifier until the black density is maintained while eliminating the reflective properties (approximately 20% by volume of gloss modifier), with the consistent density maintained throughout the press run; and
6. computerized cutting to insure that critical distances with respect to timing marks that allow the scanning process to operate according to the "Teamwork" software parameters.

For example, the paper that may be used for printing of ballots is Mark Reflex® paper from National Computer Systems or equivalent made from 100% wood-pulp paper without watermarks, embossed or printed patterns or fluorescent additives. The paper weight is on the order of 50-80 pounds although lighter or heavier weight paper may be used. The paper color is preferably white, is resistant to curl and free of foreign elements that may cause false mark detection. The caliper of the paper is preferably in the range of 0.0036 inches to 0.008 inches, with a smoothness of between 100 and 400 on the Sheffield scale. In one embodiment, the paper has a smoothness of 130 on the Sheffield scale. Furthermore, the paper preferably has a reflectance on the order of 70 percent.

In a typical ballot production printing operation, complete ballots are printed on oversized paper. The excess margin around the perimeter of each ballot must be trimmed off and discarded or recycled. Thus the individual ballot sheets are provided with cutting marks at each corner, and inspection marks to determine if each ballot is accurately cut at the proper locations. Inaccurately cut ballots will not read properly in the ballot readers.

Referring to FIG. 3A, the desired final perimeter of ballot 310 is defined by L-shaped marks 342, 344, 346, and 348, disposed at the four corners of ballot 310. To trim ballot 310 to its final size, the oversized sheet having ballot 310 printed thereupon is placed on a cutting device such as, e.g. a guillotine type cutter. In succession, the excess margins defined by marks 342-344, 344-346, 346-348, and 348-342 are cut from ballot 310.

Figure 3C:
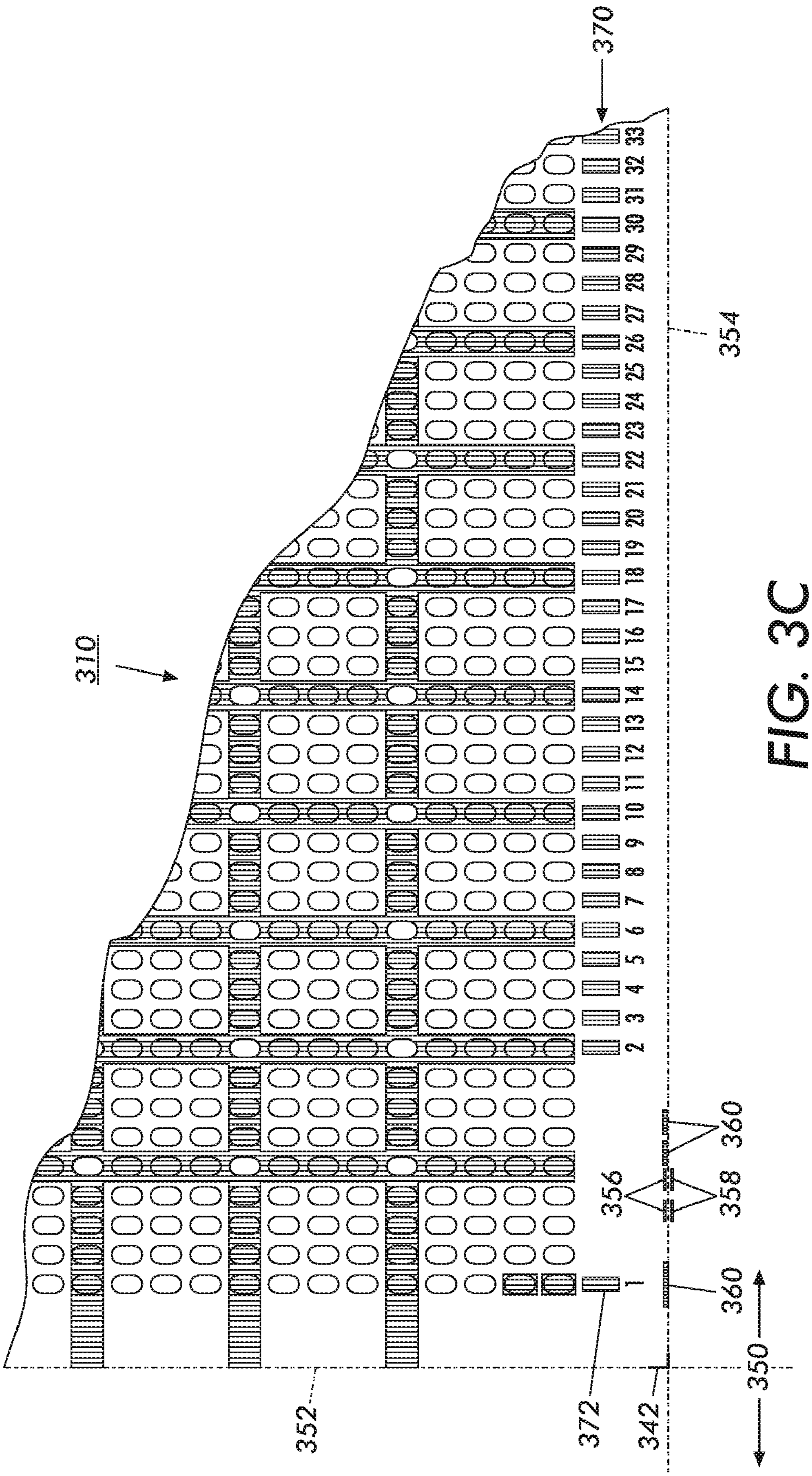
FIG. 3C is a magnified view of a lower corner portion of the blank ballot form of FIG. 3A.

Referring to FIG. 3C, inspection marks 356, 358, and 360 are provided proximate to mark 342; and equivalent marks (not shown) are provided proximate to marks 344 (see FIG. 3A). In one embodiment, such inspection marks are designed to enable quick verification of a proper cut in several ways. Marks 356 are slightly separated from marks 358, such that when margin 350 as defined by marks 342-344 is accurately trimmed, the line of cutting as indicated by dashed line 354 separates margin 350 from ballot 310 such that marks 358 remain visible in their entirety upon trimmed margin 350, and marks 356 remain visible in their entirety upon ballot 310.

In a further embodiment, a plurality of ballots forming a stack (not shown) are cut simultaneously by the cutting device (not shown). Such a stack may comprise as many as about 250 ballots, having a thickness of about three inches. To verify visually that such a stack of ballots has been properly cut, bold (thick) marks 360 are provided, such that when margin 350 as defined by marks 342-344 is accurately trimmed, the line of cutting as indicated by dashed line 354 bisects bold marks 360 of all ballots in the stack, and the remaining portion of bold marks 360 upon the cut stack of ballots (not shown) is clearly visible as a “shadow” on the side of the stack.

The ability to quickly verify that ballots are accurately cut is important. Referring again to FIGS. 3A and 3C such ballots comprise a series of timing marks 370, commencing with a “skunk mark” 372, which indicates to the ballot reader the start of a new ballot. The ballot reader comprises a laser device, which detects timing marks 370 on ballot 310. If ballot 310 is not accurately cut, rendering timing marks 370 at the proper distance from the edge 354 of ballot 310, such ballot will not read properly in the machine, and such ballot will be rejected by the machine.

Figure 5:
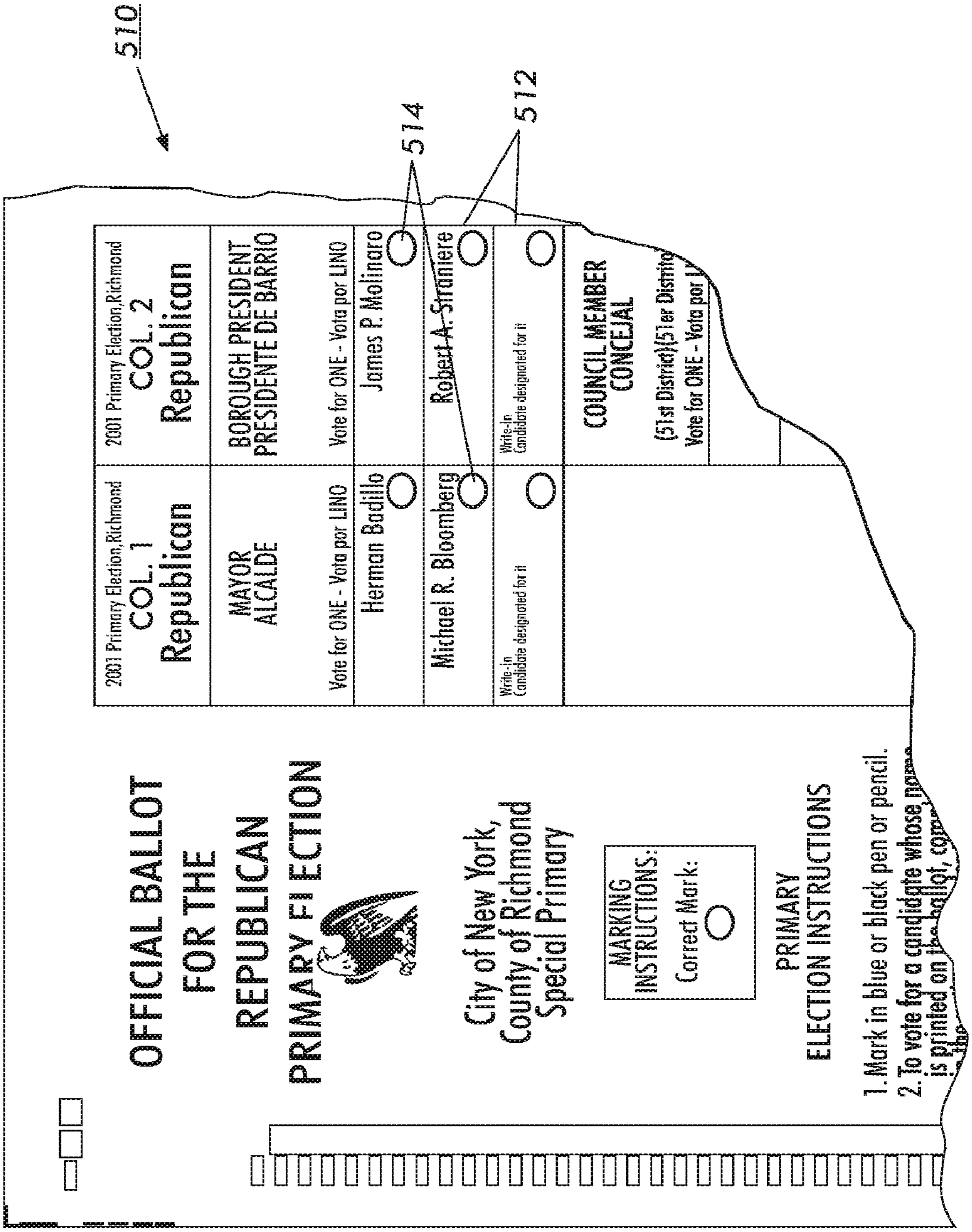
FIG. 5 is an illustrative example of one embodiment of a ballot created in accordance with the present invention, particularly including the exemplary response bubbles of the present invention.
Figure 6:
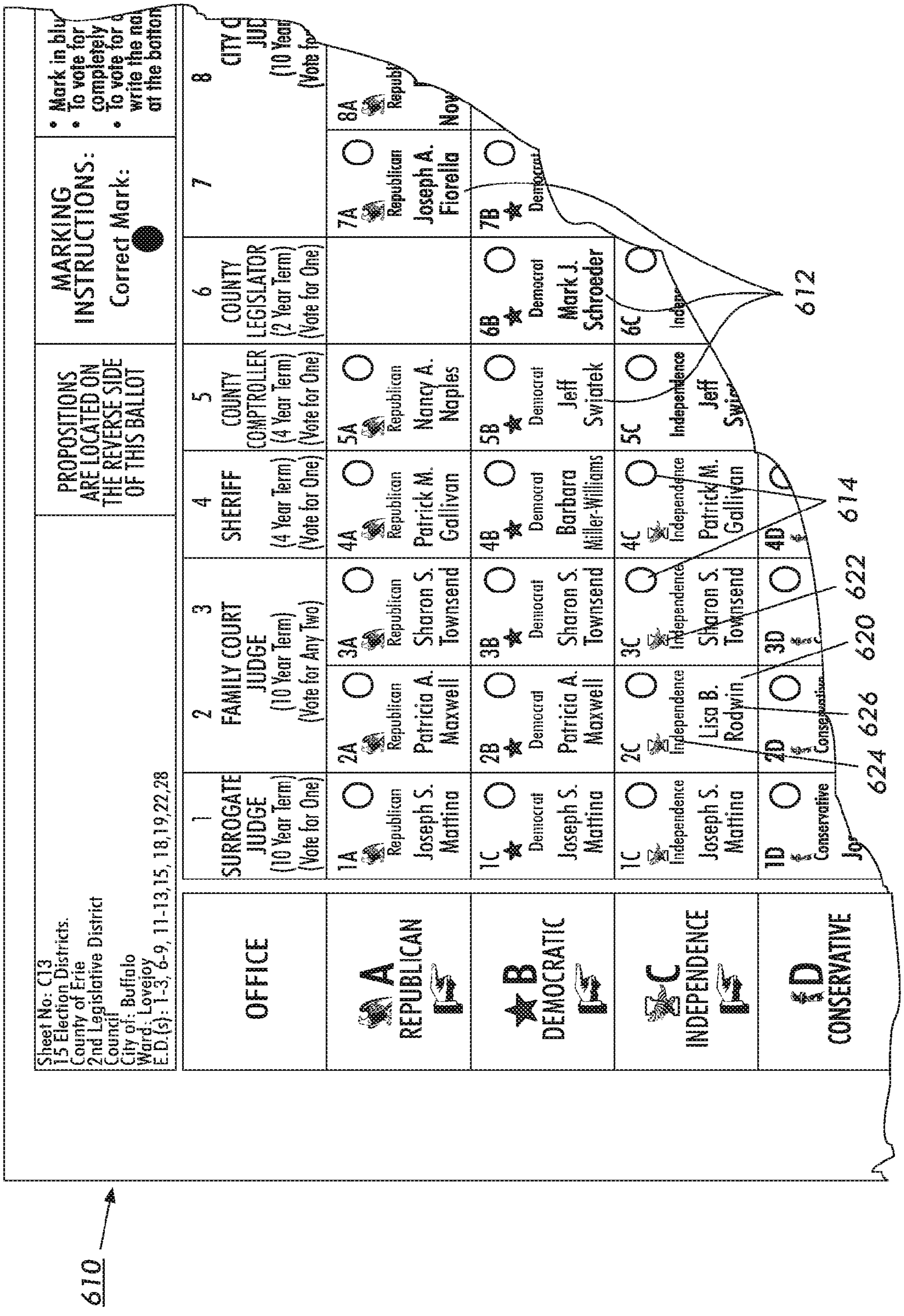
FIG. 6 is an illustrative example of another embodiment of a ballot created in accordance with the present invention, particularly including the exemplary response bubbles of the present invention.

Turning next to FIGS. 5 and 6, there are depicted examples of ballot forms 510 and 610, where each of the ballots includes candidate identification or indicia within a cell (512, 612) that also contains a response bubble (514, 614). Upon careful review it will be appreciated that the configuration of the response bubbles 514 and 614 are distinguishable from those of the ballot in FIG. 2. A first distinguishable feature (not detectable in the monotone depiction of FIGS. 5 and 6) is that response bubbles 514 and 614 are of substantially the same color as the balance of the printing on the ballot forms.

A second distinguishable feature is that response bubbles 514 and 516 are formed of a continuous closed line having a substantially elliptical shape. This is a significant difference in the scannable ballot forms of FIGS. 5 and 6 as it was previously believed that it would not be possible to create a ballot form having a continuous line that was undetectable by an optical scanning mechanism employed for reviewing and counting votes cast via such ballots.

In a further embodiment, an third distinguishing feature is that information within each cell is displaced as far as possible from the response bubble. Referring again to FIG. 6 to cell 620, for example, the party symbol 622 is displaced leftwardly and downwardly, the party name 624 is displaced downwardly, and the candidate name 626 is displaced downwardly. Such an arrangement provides additional white space around the response bubble 614, SO that the chance of recording a false reading is further decreased.

Having generally described an application of the present system, for the production of scannable voting ballots, it will be appreciated that the technology employed in the creation of such ballots may also have application in other types of scannable input forms, including but not limited to test responses, personal data entry, lottery tickets, etc. It will also be appreciated by those knowledgeable of the printing arts that the ballot layout and format may be altered so as to produce a ballot that is suitable for a particular purpose yet meets the positioning requirements necessary for optical scanning.

Figure 7:
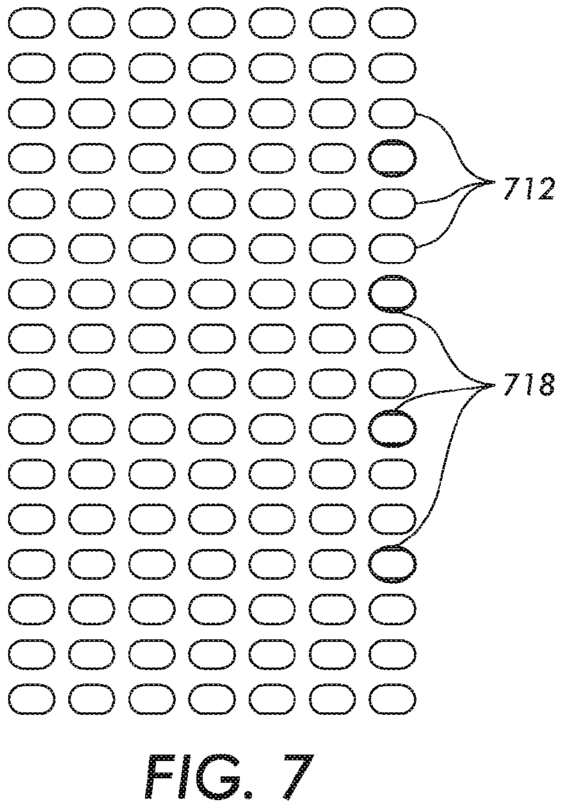
FIG. 7 is representative illustration of an array of response bubbles, which depicts the proportional relationship of the standard National Computer Systems bubble to the improved response bubble in accordance with an aspect of the present invention.
Figure 8:
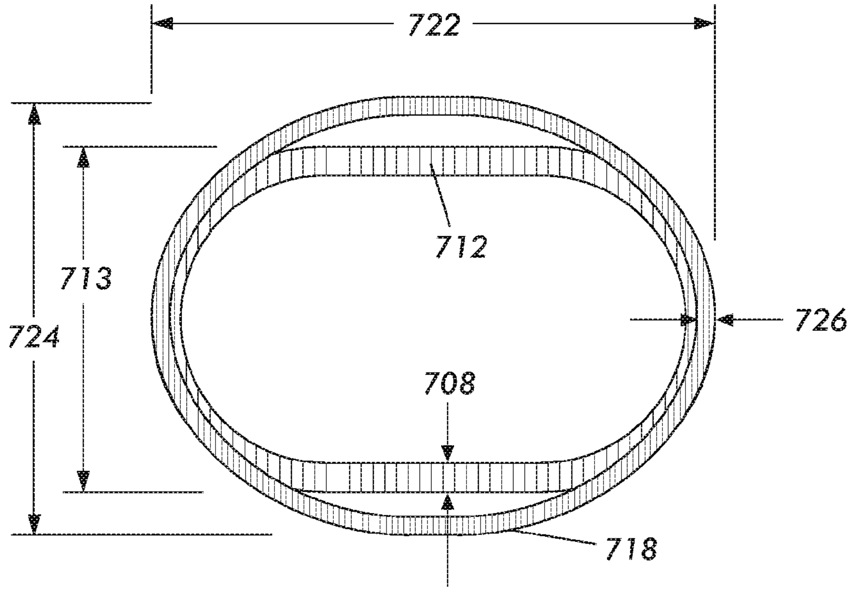
FIG. 8 is an enlarged view of the improved response bubble superimposed on the standard National Computer Systems bubble for comparison.

Turning next to FIGS. 7 and 8, the details of the improved ballot format and its printing process will be described in more detail. FIG. 7 is an illustrative example of a standard National Computer Systems series of response bubbles or cells 712 printed in red, with an improved response bubble in accordance with the present invention printed over the top thereof.

Similarly, in the enlarged view of FIG. 8, there is depicted a standard cell 712 with an improved cell 718 printed thereover. As will be appreciated from a review of the two types of bubbles or cells, the improved cell 718 is slightly larger in size so as to avoid protruding or encroaching on the blank region within the standard cell.

Improved cell 718 is preferably formed with a substantially elliptical shape. In one embodiment, improved cell 718 is formed by an ellipse having outer dimensions of width 722 of about 3.39 mm and height 724 of about 2.63 mm. It has been determined experimentally that improved cell 718 has a aspect ratio of height 724 to width 722 of between about 0.70 to 0.86, and preferably between 0.77 and 0.79. In the preferred embodiment of FIG. 8, improved cell 718 has an aspect ratio of 0.78.

Furthermore, improved cell 718 is printed as described above, having a line density 726 of between about 0.110 millimeters to about 0.113 millimeters, as compared to a density 708 of 0.134 millimeters for the standard National Computer Systems cell. In the preferred embodiment currently practiced, the present process and resulting ballots employ a line density 726 of approximately 0.111 mm in forming improved cell 718. However, line densities in the range of 0.110-0.113 are also acceptable under many printing process conditions. The lower limit of line density is a function of acceptable quality for the user of the ballot. The upper limit is of line density is constrained by the maximum line width that can be used, while avoiding of a false detection of the line by the scanning system, i.e. indicating a mark within the cell where none is present.

It will be further appreciated that the line density is, to a certain extent, a function of the printing process parameters, and that alternative degrees of line shading, appearing to the eye as a gray scale, may be employed with different printing characteristics (e.g., ink gloss level). Such shading may range from a 50 percent screen pattern to 100 percent black. Once again, it is the improved process and characteristics of the improved cell 718 that enable the improved cell 718 to be printed in a solid, dark ink color such as black, yet not be detected as a mark by the OpScan or National Computer Systems/Teamwork Scanning system.

Figure 10:
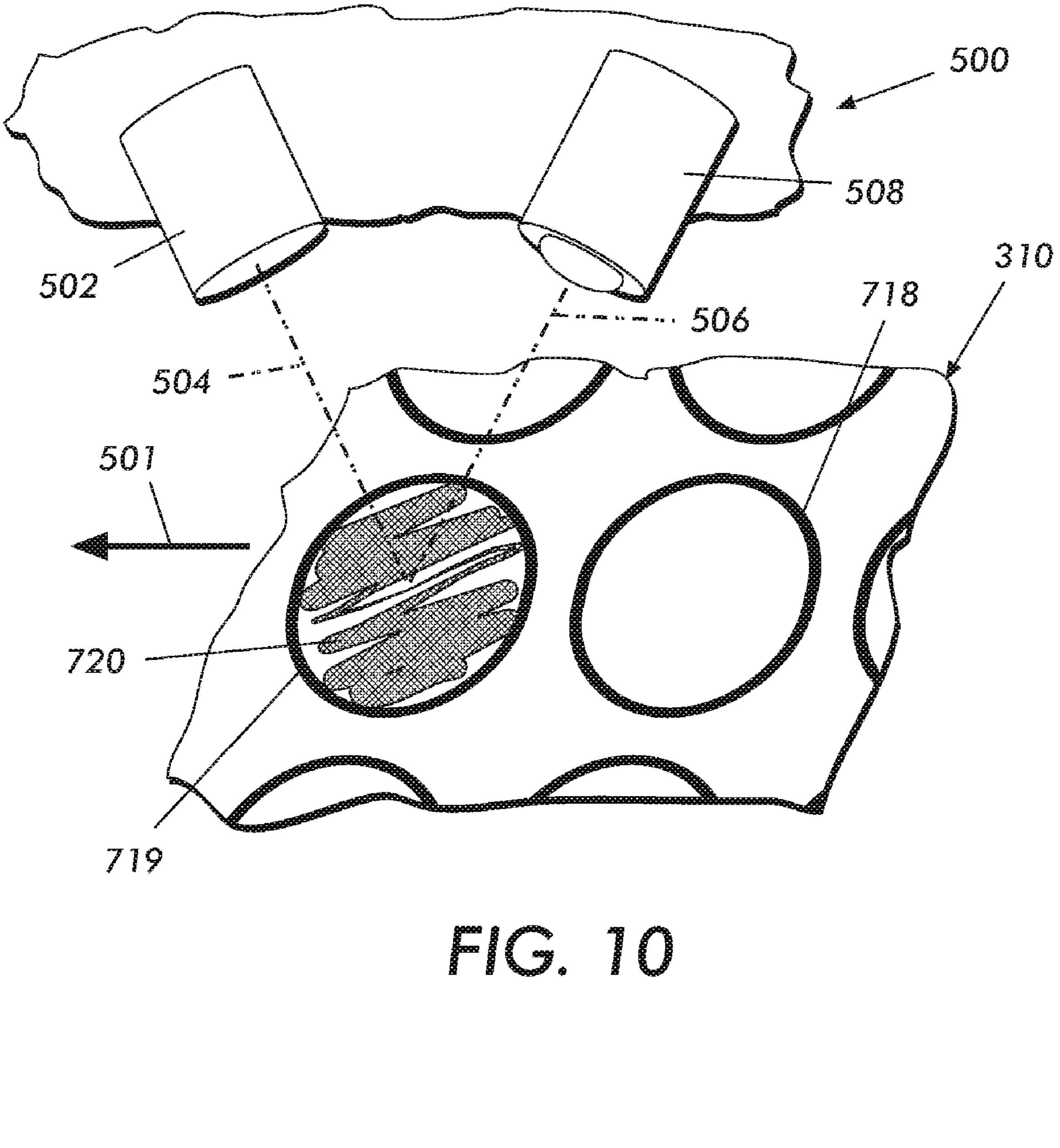
FIG. 10 is a perspective view of a method and apparatus for projecting an image of a ballot created in accordance with the present invention toward a ballot reading device.

FIG. 10 is a perspective view of a method and apparatus for projecting an image of a ballot comprising improved cells of the present invention toward a ballot-reading device. Referring to FIG. 10, depicted therein (not necessarily to scale) is a ballot 310 being delivered through a ballot reading machine 500 as indicated by arrow 501. Ballot reading machine 500 may comprise many components including a light source 502 and a photodetector 508. In the preferred embodiment, light source 502 is a diode laser, which directs a compact beam 504 of coherent light upon the surface of ballot 310. Light is reflected back along path 506 to photodetector 508 disposed adjacent to the ballot sheet 310.

The extent to which light is reflected is dependent upon the surface of ballot 310. In an instance when a response bubble is an elected response bubble 719, having been filled in by a voter with ink or pencil marking 720, less light is reflected and ballot reading machine 500 detects such an effect and scores response bubble 719 as having been selected, as response bubble 719 of ballot 310 is delivered past light source 502 and light beam 504, indicated by arrow 501. Thus the moving of ballot sheet 310 relative to light source 502 and light beam 504 is such that light beam 504 is scanned along the surface of ballot sheet 310.

In instances in which ballot reader comprises a diode laser that produces red light, prior art ballots comprise red colored response bubbles 712 of FIGS. 7 and 8. In a ballot 310 of the present invention (see FIG. 10), response bubbles 718 and 719 are made with the elliptical shape and line density previously described and shown in FIGS. 7 and 8. It has been determined that such elliptical shapes are not read by ballot readers as described herein, even when such response bubbles are printed in black ink. Accordingly, the present invention includes a method of illuminating and reflecting the image of such a response bubble of the prescribed shape and line density, or a portion of an image of such a response bubble to detecting means, so that such a response bubble can be determined as having been elected or not elected.

Figure 9:
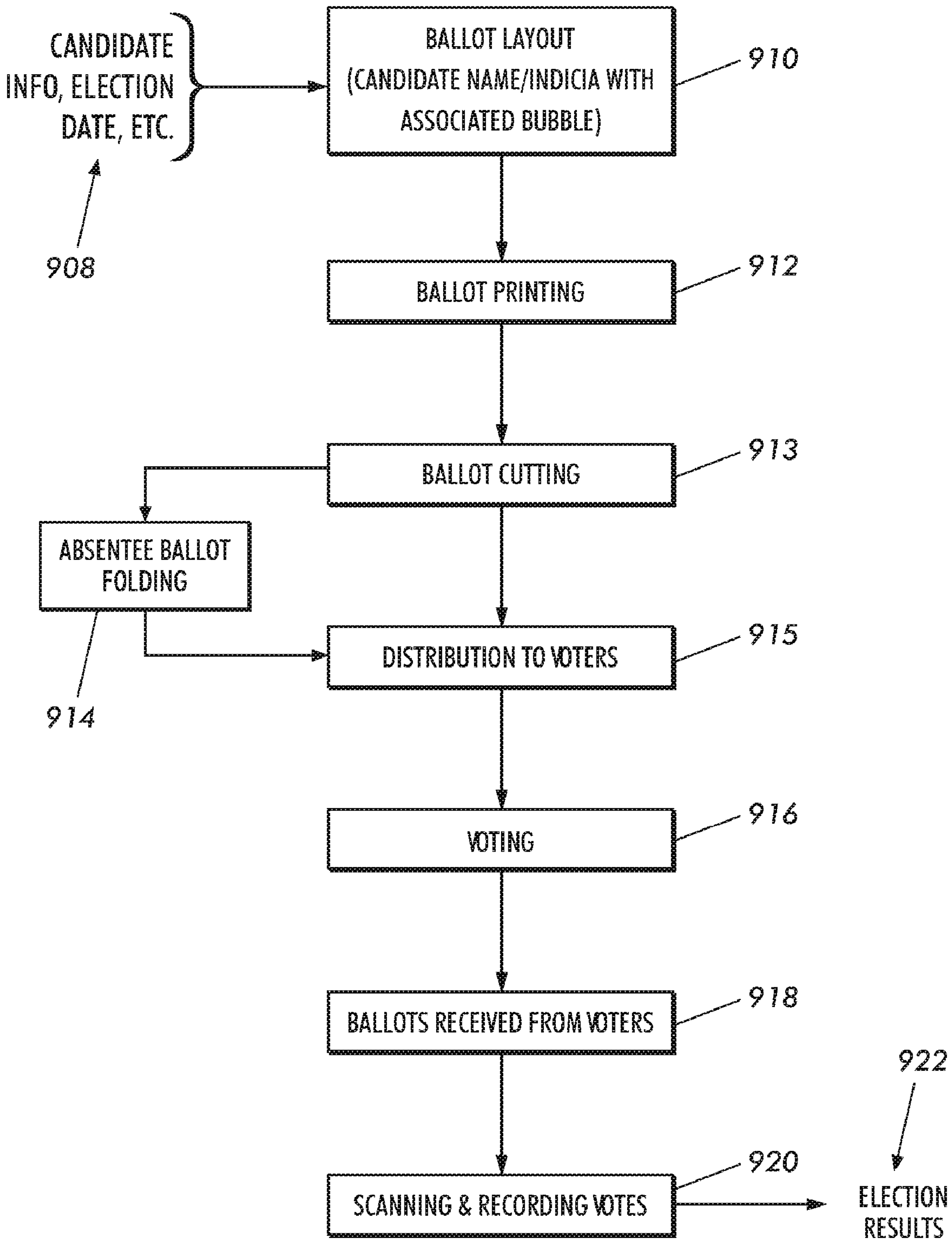
FIG. 9 is a flow diagram illustrating the various steps employed in accordance with the method of the present invention.

In accordance with another aspect of the present invention, the method of making ballots and other scannable response documents will now be described. Referring to FIG. 9, there is depicted a simple flow chart illustrating the basic steps in the preparation of a ballot or similar scannable response document. Beginning at step 910, the ballot layout process is initiated upon receipt of candidate information 908. Such information, as will be appreciated may include candidate name, party affiliation, the office sought by the candidate and also a party insignia. As previously described, the ballot is laid out using Elect It® software developed by Phoenix Graphics, Inc., where the information is input in electronic form with delimiters and is processed to place the candidate information in the ballot cells with an associated response bubble. Once laid out, processing continues at step 912, where the ballot is printed in accordance with the steps and configurations described in detail above.

After the ballots are printed, they are then cut to the final shape in step 913 using corner marks printed thereupon, for use in voting and for delivery though ballot scanning/reading machines. In instances where such ballots are to be used as absentee ballots, such ballots are folded in step 914. In step 915, the ballots are distributed to voters, via U.S. mail in the case of absentee ballots, and directly to voters who cast such ballots at a polling place.

After the voters receive such ballots, they then vote for particular candidates by finding the candidates names or similar indicia and by filling in or marking the associated response bubbles on the ballot sheet, step 916. Again, the method of printing the ballot, and in particular the line printing characteristics, enable the voter to clearly identify the response bubbles associated with particular candidates, thereby enabling the voter to place marks within such bubbles without visual assistance.

Once the ballot has been marked, the voter then returns the ballot sheet to a central location or the polling place, step 918. Once collected, the ballots are scanned and the votes cast thereon are recorded as indicated by step 920 in order to determine election results 922. It will be appreciated that the nature of a ballot requires a high degree of confidence in the scanning and recognition of a vote cast for a particular candidate. Accordingly, as has been described herein, the design and printing method employed for the scannable ballot form inherently requires significant testing and confirmation of the process so as to render it acceptable for use in ballots.

In accordance with aspects of the present invention, a ballot test sheet was produced in the manner described herein. In such a test, a series of response cells were printed using the printing system and process previously described. The response bubbles were printed out on a grid having center-to-center distance of approximately 4.3 mm in accordance with a standard National Computer Systems response sheet. To test the ability of the bubbles to resist false positive detection, i.e. detection as a filled-in elected response bubble, when no marks were present in the bubble, numerous scans of 10,000 sheets (not shown) of response bubble grids were scanned.

These sheets each comprised a series of over 130 different response bubbles. The series began with response bubble test number 1, which had the shape, height 713 of about 2.11 millimeters, and line density of the standard National Computer Systems response bubble 712 of FIGS. 7 and 8, but was printed in black ink. From that bubble shape, subsequent bubble shapes were gradually changed, incrementally changing toward the elliptical shape and line density of response bubble 718 of FIGS. 7 and 8. Response bubble test number 127 had the shape and line density of response bubble 718 of FIGS. 7 and 8. The sheets further comprised additional response bubble test numbers 128-135 the heights 724 (see FIG. 8) of which were made increasingly large.

The results of the test of 10,000 sheets of such various response bubbles were as follows:

Response bubble test numbers 1 through 121 resulted in false positive readings, i.e. such bubbles were detected as marked when no marks were present therein. Response bubble test numbers 122 through 126 showed a decreasing number of false positive readings. Response bubble test number 127, having the shape and line density of response bubble 718 of FIGS. 7 and 8, had no false positive readings, and is thus considered the preferred embodiment of a ballot of the present invention. Additional response bubble test numbers 128-135 having increasing height as previously described, resulted in a propensity to encroach into the areas of adjacent response bubbles and cause erroneous readings.

In a subsequent test, ten thousand ballots, in both 11 inch and 14 inch formats and two-across perforated (e.g., 22 inch) format, were produced with all response bubbles having the shape of response bubble test number 127 (i.e. response bubble 718 of FIGS. 7 and 8). All formats were scanned multiple times and resulted in no scanning errors. Subsequently, such ballots were employed in the fall election cycle of 2001 with perfect results (no false positive detection of the response bubbles). Accordingly, the ballots, permit a method of reflecting at least a portion of an image of response bubbles on such ballots to a ballot reading device, and a process used to make them has been verified through testing and actual use in an election cycle in September-November 2001.

It is, therefore, apparent that there a method and apparatus for printing of an improved voting ballot and other scannable response forms have been disclosed so as to enable the printing and use thereof in a cost-efficient manner. While the form (e.g., a ballot) and its method of use and manufacture have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for recording a voter's ballot selection in an election, comprising:

receiving information about a plurality of candidates;

laying out a ballot, said layout including the information;

printing a ballot on at least a portion of one side of a substrate, said ballot including a plurality of indicia and associated response bubbles, wherein said indicia and bubbles are arranged in a predefined orientation, wherein said response bubbles are of a substantially elliptical shape;

providing said ballot to a voter for casting of at least one vote by placing a mark within at least one of the response bubbles;

retrieving a completed ballot after said voter has cast the at least one vote; and scanning said completed ballot, using an optical scanning device, to detect and record only those marks within the response bubbles as votes for candidates represented by the associated indicia.

2. The method of claim 1, wherein laying out the ballot further includes spacing the candidate information within a grid oriented relative to the substrate; and where printing the plurality of indicia and associated response bubbles includes printing in black ink, where the response bubbles are printed with a continuous curvilinear line to provide a complete, visible bubble to a voter.

3. The method of claim 2, wherein the grid includes an array of grid cells defined by a plurality of rows and columns, and where said rows and columns define the location of response bubbles and the associated indicia.

4. The method of claim 1 wherein printing a plurality of indicia further includes printing a candidate's name and political party affiliation.

5. The method of claim 1, wherein printing of said response bubbles is accomplished using a non-reflective black ink.

6. The method of claim 1, wherein printing of at least said response bubbles is accomplished using a non-reflective black ink including a gloss modifier to eliminate the reflectiveness of the printed response bubbles.

7. The method of claim 1, wherein the gloss modifier is not greater than about twenty percent by volume.

8. The method of claim 1, further including precision cutting of substrate margins prior to distribution of the printed ballot.

9. The method of claim 5 wherein the ballot substrate has an equivalent paper weight of between fifty and eighty pounds.

10. The method of claim 9, wherein the ballot substrate has a smoothness of between 100 and 400 on the Sheffield scale.

11. The method according to claim 1, wherein said indicia and bubbles are arranged within the cell so as to maximize a separation from one another.

12. The method of claim 1, wherein the aspect ratio of the elliptical shape of each response bubble is between about 0.70 and about 0.86.

13. The method of claim 1, wherein the aspect ratio of the elliptical shape of each response bubble is between about 0.77 and about 0.79.

14. A method for producing a scannable sheet for user selection of lottery ticket numbers, comprising:

printing on at least a portion of one side of a substrate used to make the scannable sheet, using an ink that is non-reflective for a plurality of scanning light colors, a plurality of timing marks proximate at least one edge of the substrate; and printing, on the side of the substrate used to make the scannable sheet, a plurality of marks to indicate a plurality of response regions, said marks being printed using the ink that is non-reflective for a plurality of scanning light colors, wherein said marks are arranged in a predefined orientation and spacing relative to the substrate and where said marks are printed with at least one continuous curvilinear line segment so as to indicate the response region associated therewith and where said marks are generally aligned with said response regions.

* * * * *